United States Patent [19]

Matthews et al.

[11] 4,205,898
[45] Jun. 3, 1980

[54] OPTICAL FIBER CONNECTOR

[75] Inventors: Maurice A. Matthews, Basingstoke; Raymond Ellor, Alton, both of England

[73] Assignee: ITT Industries, Inc., New York, N.Y.

[21] Appl. No.: 875,997

[22] Filed: Feb. 8, 1978

[30] Foreign Application Priority Data

Mar. 24, 1977 [GB] United Kingdom ............... 12432/77

[51] Int. Cl.² .................. G02B 5/14; H01R 15/04
[52] U.S. Cl. .................. 350/96.21; 174/84 R
[58] Field of Search ............ 350/96.20, 96.21, 96.22; 174/84 C, 84 R, 84 S; 339/217 PS, 217 S, 219 R, 220 R

[56] References Cited

U.S. PATENT DOCUMENTS

| Re. 26,994 | 12/1970 | Fuller et al. | 174/84 R |
| 3,936,145 | 2/1976 | McCartney | 350/96.22 |
| 4,090,778 | 5/1978 | Phillips | 350/96.21 |
| 4,101,198 | 7/1978 | Heldt | 350/96.21 |
| 4,114,979 | 9/1978 | Heldt | 350/96.21 |

OTHER PUBLICATIONS

Heldt, "Sleeve #3", Hewlett-Packard, No. A-50448, drawing dated Jul. 12, 1976.

Primary Examiner—Stewart J. Levy
Attorney, Agent, or Firm—Thomas L. Peterson

[57] ABSTRACT

An optical fiber connector in which ferrules terminated to optical fibers are laterally aligned in a delta-shaped, longitudinally split spring sleeve.

8 Claims, 3 Drawing Figures

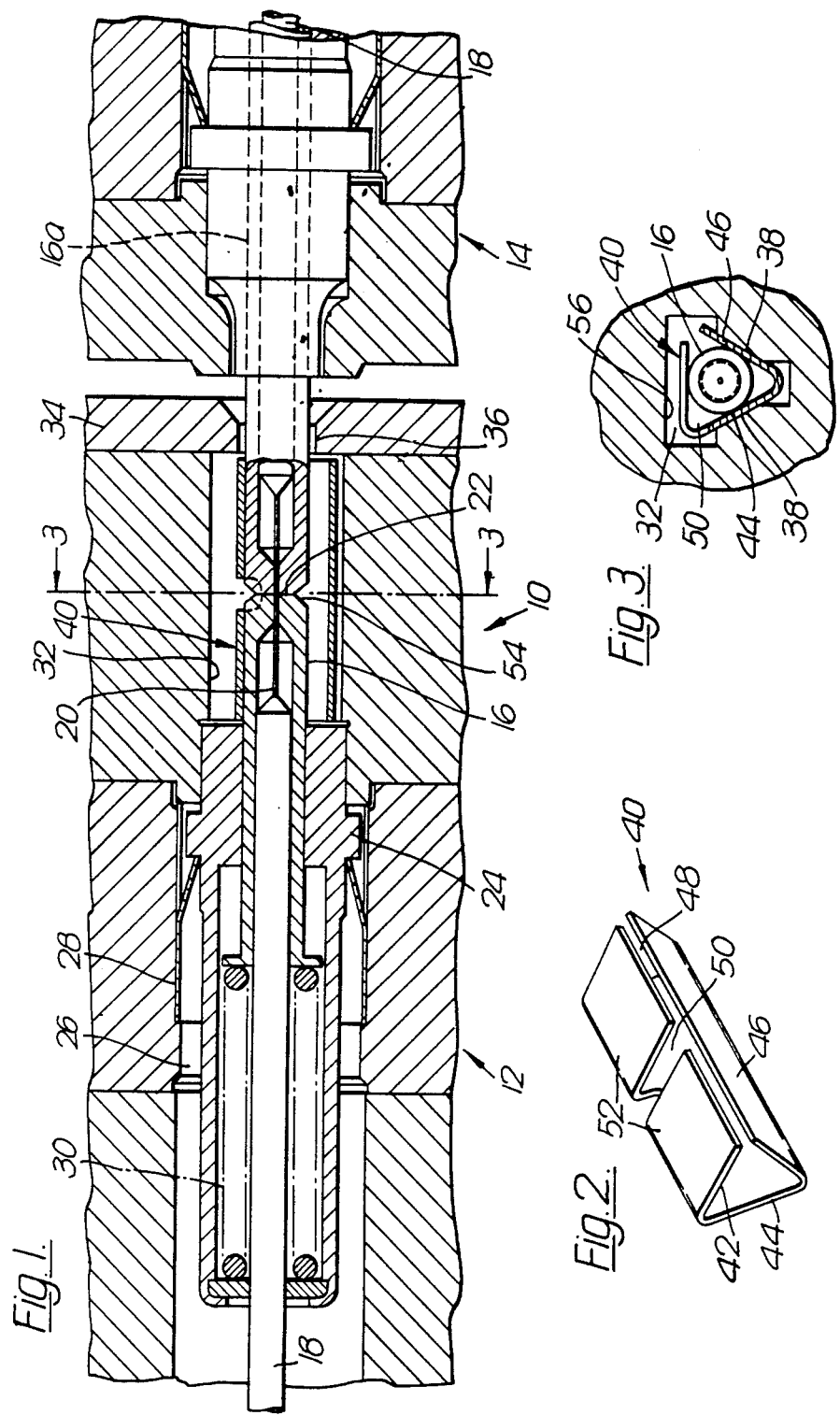

OPTICAL FIBER CONNECTOR

BACKGROUND OF THE INVENTION

The present invention relates to a demountable coupling device for use in connectors for optical fibers.

Owing to the relatively small size of optical fibers, it is essential when coupling them in series for the fibers to be accurately laterally aligned to avoid excessive loss of light at the coupling point.

There is known in the art a variety of different spring arrangements for aligning optical fibers. U.S. Pat. No. 3,885,859 to Dalgleish et al. discloses an optical fiber connector in which a spring member urges two bare optical fibers into a V-groove for aligning the fibers. U.S. Pat. No. 3,936,145 to McCartney discloses the use of a longitudinally split generally cylindrical spring sleeve into which ferrules connected to optical fibers are pushed for resiliently aligning the ferrules and thus the fibers therein.

An object of the present invention is to provide a very simple and inexpensive optical fiber connection arrangement for precisely laterally aligning optical fibers.

SUMMARY OF THE INVENTION

According to the principal aspect of the present invention, there is provided an optical fiber connection arrangement for effecting lateral alignment of a pair of optical fibers each terminated by a ferrule. The connector comprises an elongated tubular spring metal member of generally delta cross-section providing three sides. A longitudinal slot extends the length of the tubular member. One side of the tubular member adjacent to the slot has a transverse slot therein opening at the longitudinal slot providing a pair of independently movable spring flaps each of which biases a ferrule against the other two sides of the tubular member. By the provision of the two independently movable spring flaps, ferrules of slightly different diameters may be independently and, therefore, fully seated into the V-groove formed by the other two sides of the delta-shaped tubular member to precisely laterally align the optical fiber ferrules.

BRIEF DESCRIPTION OF THE DRAWINGS

FIG. 1 is a fragmentary, longitudinal sectional view showing an optical fiber connector embodying the novel delta-shaped tubular spring metal alignment member of the present invention;

FIG. 2 is a perspective view of the alignment member illustrated in FIG. 1; and

FIG. 3 is a transverse sectional view taken along line 3—3 of FIG. 1

DESCRIPTION OF THE PREFERRED EMBODIMENT

Referring now to FIG. 1 of the drawing in detail, there is illustrated an optical fiber connector, generally designated 10, including a plug connector member 12 and a receptacle connector 14. The plug connector member contains a plurality of ferrules 16, only one being shown. Each ferrule is connected to a fiber optic cable 18. The forward end of the fiber 20 of the cable 18 is centrally located at the forward end of the ferrule 16 with the end face of the ferrule and the fiber end polished to provide a flat mating end face 22.

The ferrule 16 in the plug connector member 12 is located within a sleeve 24 which is itself mounted in a tunnel 26 extending axially through the plug 12. The sleeve 24 is retained axially in place within the tunnel by a retaining clip 28 and the ferrule is held in the sleeve 24 by a coil spring 30 which urges the ferrule forwardly in the plug connector member. The coil spring provides "contact pressure," when the connector members are mated. The ferrule 16 extends forwardly of the tunnel 26 into an elongated channel 32. A plate 34 at the front of the plug connector member provides a restricted entryway 36 for the channel 32.

The receptable connector member 14 contains a plurality of ferrules 16a aligned with each of the ferrules 16 in the plug connector member, only one of such ferrules being shown in the drawing. The ferrule 16a may be mounted in the receptacle connector member in a manner similar to that of the ferrule 16 in the plug connector member although the spring 30 may be omitted. It is noted that the forward end of the ferrule 16a projects from the front face of the receptacle connector member and extends through the entryway 36 into the channel 32 in the plug connector member.

As best seen in FIG. 3, the channel 32 is T-shaped in cross-section. The inner sections of the slots forming the T-shaped channel are cut off to form two inclined but non-intersecting planes 38 which extend parallel to the axis of the ferrule 16. An elongated, tubular spring metal alignment sleeve, generally designated 40, is mounted in the channel 32. The alignment sleeve has a delta cross-section, providing three flat sides 42, 44, and 46. The flat sides 44 and 46 bear against the planar surfaces 38 of the channel 32 for supporting the same. A longitudinal slot 48 extends the length of the alignment sleeve at the intersection of the sides 42 and 46 thereof. A transverse slot 50 is formed in the side 42 midway between the ends of the alignment sleeve. The transverse slot 50 extends from the longitudinal slot 58 across the side 42 and downwardly into the adjacent side 44 of the alignment sleeve. The slot 50 therefore provides a pair of independently movable spring flaps 52. The alignment sleeve 40 is retained in the channel 32 against axial movement by the plate 34 and the sleeve 24.

The diameter of each ferrule 16 and 16a is selected so that the spring flaps 52 will be moved upwardly slightly when the ferrules are inserted into the alignment sleeve whereby the flaps will produce a resilient force against the ferrules. As seen in FIG. 3, the upper wall 56 of the T-shaped channel 32 is located well above the flaps 52 thereby providing clearance for the flaps to expand when the ferrules are inserted into the alignment sleeve.

When the connector members 12 and 14 are mated, the ferrules abut at their mating end faces 22 in the region of the transverse slot 50 so that the spring faps 52 of the alignment sleeve bear independently upon the ferrules, urging them against the sides 44 and 46 opposite to the flaps. The sides 44 and 46 form a V-groove which causes the ferrules to become precisely laterally aligned when pressed into the groove by the resilient spring flaps. It is noted that the front ends of the ferrules are bevelled, as indicated at 54, to facilitate mating of the ferrules in the alignment sleeve 40. In an alternative arrangement a bevel may be applied to the alignment sleeve instead of or additional to the feature 54 of the ferrule.

The independent action of the spring flaps 52 is an important feature in that it assures that both ferrules are fully seated in the V-groove of the alignment sleeve even though the diameters of the ferrules might differ slightly due to manufacturing tolerances.

What is claimed is:

1. An optical fiber connection arrangement for effecting lateral alignment of a pair of optical fibers each terminated by a ferrule comprising:
   an elongated, tubular spring metal member of general delta cross-section providing three sides;
   a longitudinal slot extending the length of said tubular member; and
   one side of said tublar member adjacent to said slot having a transverse slot therein opening at said longitudinal slot providing a pair of independently movable spring flaps each adapted to bias a ferrule against the other two sides of said tubular member.

2. An optical fiber connection arrangement as set forth in claim 1 wherein:
   said transverse slot is located midway between the opposite ends of said tubular member.

3. An optical fiber connection arrangement as set forth in claim 1 wherein:
   said other sides are flat.

4. An optical fiber connection arrangement as set forth in claim 1 wherein:
   all sides of said tubular member are flat.

5. An optical fiber connection arrangement as set forth in claim 1 wherein:
   said longitudinal slot is located at the intersection of said one side and one of said other sides.

6. An optical fiber connection arrangement as set forth in claim 5 wherein:
   said transverse slot extends through said one side into the side of said tubular member opposite to said longitudinal slot.

7. An optical fiber connection arrangement as set forth in claim 1 including:
   a pair of fiber terminates ferrules having mating end faces; and
   said ferrules extending into the opposite ends of said tubular member with said mating end faces in substantially abutting relationship in the region of said transverse slot.

8. An optical fiber connection arrangement as set forth in claim 7 wherein:
   said end faces of said ferrules are bevelled to facilitate insertion of said ferrules into said tubular member.

* * * * *